United States Patent [19]

Khutoretsky et al.

[11] 4,132,914
[45] Jan. 2, 1979

[54] SIX-PHASE WINDING OF ELECTRIC MACHINE STATOR

[76] Inventors: Garri M. Khutoretsky, ulitsa Altaiskaya 20, kv. 5; Alexandr I. Vorontsov, Pushkin, ulitsa Khazova 43, kv. 94; Larisa A. Drozdova, prospekt Karla Marxa, 25, kv. 26; Boris S. Yanik, Moskovsky prospekt 128, kv. 34, all of Leningrad, U.S.S.R.

[21] Appl. No.: 732,641

[22] Filed: Oct. 15, 1976

Related U.S. Application Data

[63] Continuation of Ser. No. 570,495, Apr. 22, 1975, abandoned.

[51] Int. Cl.$^2$ ............................................. H02K 3/00
[52] U.S. Cl. .................................. 310/184; 310/198; 310/205
[58] Field of Search ............... 310/179, 71, 180, 184, 310/189, 198, 200–208; 318/225 R, 225 A; 321/7, 26

[56] References Cited

U.S. PATENT DOCUMENTS

| | | | |
|---|---|---|---|
| 2,783,403 | 2/1957 | Schumaier | 310/202 |
| 3,187,245 | 6/1965 | Sisk | 318/225 R |
| 3,214,717 | 10/1965 | Brodersen | 310/267 |
| 3,430,126 | 2/1969 | Richardson | 310/198 |
| 3,462,667 | 8/1969 | Jackson | 310/49 |
| 3,549,919 | 12/1970 | Spisak | 310/184 |
| 3,629,684 | 12/1971 | Christen | 321/7 |
| 3,739,213 | 6/1973 | Willyoung | 310/198 |
| 3,868,564 | 2/1975 | Arutjunian | 310/198 |
| 3,878,415 | 4/1975 | Wesolowski | 310/184 |

Primary Examiner—R. Skudy
Attorney, Agent, or Firm—Haseltine, Lake & Waters

[57] ABSTRACT

An arrangement in multiphase electrical machines in which a six-phase winding is provided with reduced maximum voltage between the terminals in the end portion. Three-phase windings are wound in opposite directions such that if one three-phase winding is wound clockwise, then the other three-phase windings is wound counterclockwise. The terminals of the three-phase windings are brought out at different sides of the stator. The winding reduces the highest possible voltage in the phase zone junction.

1 Claim, 2 Drawing Figures

SIX-PHASE WINDING OF ELECTRIC MACHINE STATOR

This is a continuation of application Ser. No. 570,495 filed Apr. 22, 1975 now abandoned.

The present invention relates to electrical engineering, and more particularly, it relates to windings of multiphase electric machines, such as six-phase windings of stators of turbogenerators.

Development of power engineering is marked by a continuous increase in the turbogenerator specific output. One of the ways ensuring an increase in the machine output without enlarging the overall dimensions thereof is the employment of six-phase stator windings. Six-phase windings increase the machine specific output due to improved distribution factor. In addition, said windings offer a number of other advantages, such as reduced additional losses of the machine.

The six-phase windings are advisable for use in the turbogenerators of 1200 MW and more.

The known six-phase windings of the turbogenerator stators are formed by two three-phase windings electrically shifted relative to each other. Generally, said shift equals 30 electrical degrees. In the latter case, the six-phase e.m.f. put out at the machine terminals may be easily converted into a three-phase e.m.f. with the aid of a transformer whose one low-voltage winding is star-connected while the other is delta-connected and which are connected to different three-phase windings of the generator. The transformer high-voltage winding is star-connected.

One of the disadvantages of said six-phase winding of a conventional arrangement is an increased voltage, as compared with a three-phase windings, between the bars in the end portions of the winding.

Increasing the turbogenerator power increases the stator winding voltage. At present powerful turbogenerators are designed for 22 kV and more. One of the main difficulties presented by the voltage rise is scintillation at the end portions of the stator windings.

Used widely in turbogenerators are three-phase two-layer windings wherein the highest voltage between the adjacent bars in the end portions occurs at the phase zone joint and insulation at these points is subject to the most heavy scintillation.

In the case of a star-connection of the windings, this voltage amounts to 1.73 of the phase voltage. Various design measures are taken to improve the operating conditions of the insulation on the end portions; among said measures are application of the semi-conductor coatings to the end portion insulation, equlization of the field and the like. However, the tendency for an increase in voltage presents a number of difficulties in the accomplishment of the above measures.

In said six-phase windings with three-phase windings shifted through 30 electrical degrees the voltage between the bars arranged at the phase zone joint in the end portions exceeds the phase voltage by a factor of 1.93 i.e. by 11.5% as in the case of three-phase windings with the same phase voltage.

The object of the present invention is to provide a six-phase winding with a reduced maximum voltage between the bars in the end portion.

This object is achieved by winding three-phase windings incorporated in a six-phase winding into opposite directions i.e. if one three-phase winding phase is wound clockwise, than the other three-phase winding like phase is wound counterclockwise. It is preferable that the leadouts of said three-phase windings are brought out at different sides of the stator.

Such a winding reduces the highest possible voltage in the phase zone joint which now approximates the phase voltage. Such an arrangement practically eliminates scintillation even at a high rated voltage. This progressive principle may be used for increasing the rate value of the machine.

Given below is a detailed description of the invention with reference to an embodiment thereof as a two-layer six-phase winding with 36 slots (the number of slots may vary) taken in conjunction with the accompanying drawings wherein.

Figure 1:
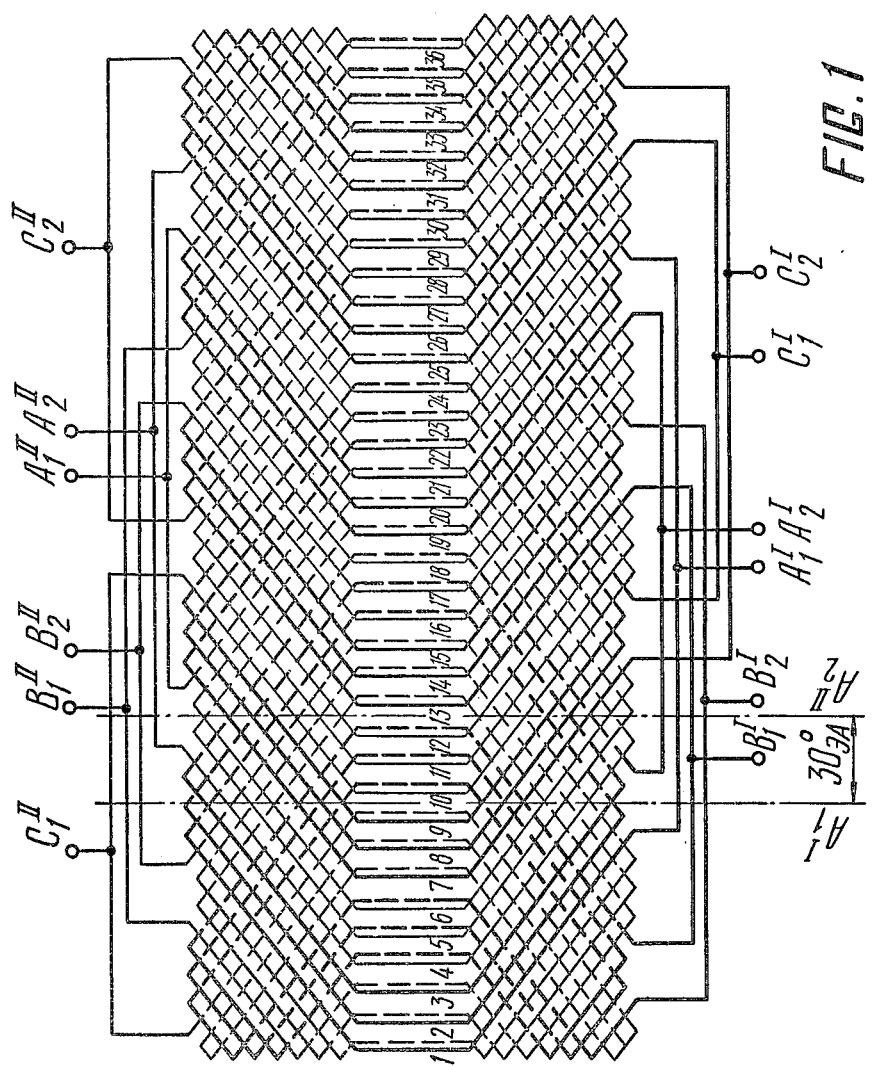
FIG. 1 is a schematic circuit diagram of a six-phase winding, according to the invention.

FIG. 1 shows a two-layer six-phase winding of a stator of a turbogenerator comprising two three-phase windings shifted relative to each other through 30 electrical degrees Reference numerals 1 through 36 indicate the number of the stator winding slots. The upper bars are shown in the drawing by solid lines, the lower bars, by dashed lines. The first three-phase winding is shown by thick lines, the second three-phase winding, by thin lines. The leadouts of the three-phase windings are brought out at opposite sides of the stator. The starts of the phases of the first three-phase winding are indicated by $A_1^I$, $B_1^I$, $C_1^I$, and the finishes thereof by $A_2^I$, $B_2^I$, $C_2^I$. The starts of the phases of the second three-phase winding are labelled by $A_1^{II}$, $B_1^{II}$, $C_1^{II}$, and the finishes thereof, by $A_2^{II}$, $B_2^{II}$, $C_2^{II}$ respectively.

Each phase of the winding occupies circumferentially two phase zones, i.e. the entire circumference is divided into twelve phase zones. Each phase zone of the embodiment described herein has three slots.

For instance, the first zone of phase A on the upper bars occupies slots 1,2,3; the second zone of phase A occupies slots 19, 20, 21.

The groups of coils of one phase lodged in different phase zones are connected in parallel (a series connection is also possible). FIG. 1 shows a shift of 30 electrical degrss between the axes of phases $A^1$ and $A^{II}$ of the three-phase windings.

The turns comprising the first zone of phase $A^I$ are so connected that to run said winding we pass successively slots 1-16-2-17-3-18, i.e. we shift rightward in FIG. 1. The next zone is occupied by phase $A^{II}$ of the second three-phase winding. As seen from FIG. 1 to run said winding we pass successively slots 21-6-20-5-19-4, i.e. we shift leftward in the drawing.

Thus, the first three-phase winding is wound from left to right (clockwise), while the second three-phase winding is wound from right to left (counterclockwise) in the drawing.

The like phases of the three-phase windings are wound in the opposite directions. The voltage between the bars at the phase zone joint approximates the phase voltage. This is illustrated in FIG. 2.

Figure 2:
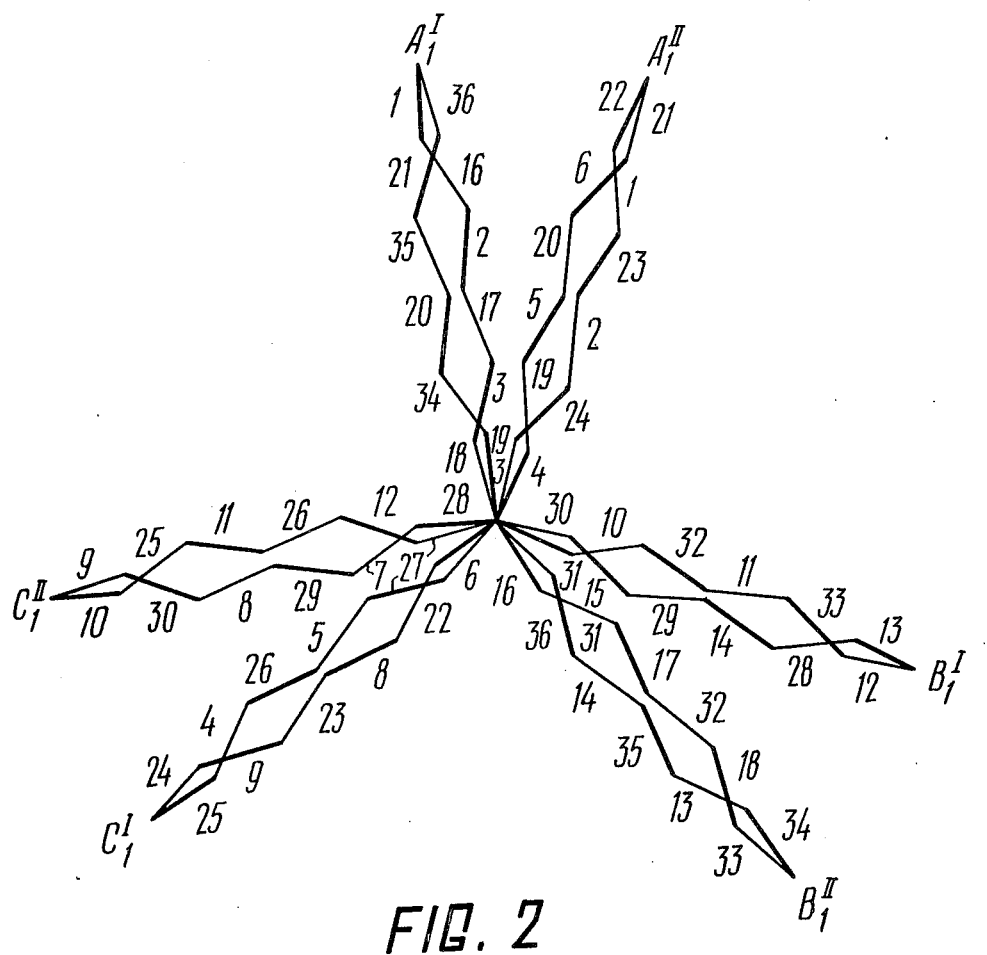
FIG. 2 is a vector diagram of the slot e.m.f. of a six-phase winding shown in FIG. 1.

The numeration of the six-phase winding slot e.m.f. vectors in FIG. 2 corresponds to the numeration of the stator slots in FIG. 1. The upper bar e.m.f. are indicated by a thick line, the lower bar e.m.f., by a thin line.

The e.m.f. of one zone of phase $A^1$ of the first three-phase system equals the sum of the vectors illustrating the e.m.f. of slots 1-16-2-17-3-18 respectively. The e.m.f. vector of the slot 1 is at the start of the phase, while the e.m.f. vector of the slot 18 is at the finish of the phase, i.e. the bar lodged in the slot 1 is at the phase voltage relative to the earth, while the bar lodged in the slot 18 is at the null voltage respectively.

Consider now the voltage across the phase zone joint for instance, between the bars lodged in the slots 1 and 36 (the upper bars).

The upper bar lodged in the slot 1 relates to phase $A^I$ of the first three-phase winding; the upper bar lodged in the slot 36, to phase $B^{II}$ of the second three-phase winding. As seen from FIG. 2, the voltage between said bars exceeds the phase voltage only by half of the turn voltage value. The voltage between other bars lodged at the phase zone joints does not exceed the above value either.

Thus, the highest possible voltage at a phase zone joint of the six-phase winding is reduced to approximate the phase voltage.

What is claimed is:

1. A six-phase winding in an electric machine stator comprising: two three-phase windings electrically shifted relative to each other, through 30 electrical degrees, like phases of said three-phase windings being wound in opposite directions so that one three-phase winding is wound clockwise while the other is wound counterclockwise, each phase winding being wound in one direction, a like phase being wound in another direction so that directions of separate phase windings alternate, leadouts of the three-phase windings being brought out at different sides of said stator, said windings being shifted both electrically and spatially relative to one another by 30°, said six-phase winding being a two-layer winding of a stator in a turbo generator, said leadout being brought out at opposite sides of said stator, each phase of the winding occupying circumferentially two-phase zone, the entire circumference being divided in two twelve phase zones, each phase zone having three slots, groups of coils of one-phase lodged in different phase zones being connected in parallel, voltage prevailing between the twin bars at a phase zone joint being substantially equal to the phase voltage, the highest possible voltage at a a phase long joint of said six-phase winding being reduced substantially to the phase voltage.

* * * * *